US012282351B2

(12) United States Patent
Horng et al.

(10) Patent No.: US 12,282,351 B2
(45) **Date of Patent: *Apr. 22, 2025**

(54) BANDGAP REFERENCE CIRCUIT

(71) Applicant: Taiwan Semiconductor Manufacturing Company, Ltd., Hsinchu (TW)

(72) Inventors: Jaw-Juinn Horng, Hsinchu (TW); Chin-Ho Chang, Hsinchu (TW); Yi-Wen Chen, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,402

(22) Filed: Mar. 27, 2023

(65) Prior Publication Data

US 2023/0229186 A1 Jul. 20, 2023

Related U.S. Application Data

(63) Continuation of application No. 17/396,981, filed on Aug. 9, 2021, now Pat. No. 11,614,764, which is a continuation of application No. 16/682,683, filed on Nov. 13, 2019, now Pat. No. 11,086,348, which is a continuation of application No. 16/195,176, filed on Nov. 19, 2018, now Pat. No. 10,520,972.

(60) Provisional application No. 62/592,544, filed on Nov. 30, 2017.

(51) Int. Cl.

| | |
|---|---|
| ***G05F 3/26*** | (2006.01) |
| ***G05F 3/30*** | (2006.01) |

(52) U.S. Cl.
CPC ................ *G05F 3/267* (2013.01); *G05F 3/30* (2013.01)

(58) Field of Classification Search
CPC .................................. G05F 3/267; G05F 3/30
See application file for complete search history.

(56) References Cited

U.S. PATENT DOCUMENTS

| | | | | |
|---|---|---|---|---|
| 6,906,581 | B2 | 6/2005 | Kang et al. | |
| 7,119,620 | B2 | 10/2006 | Pan | |
| 7,301,321 | B1 | 11/2007 | Uang | |
| 8,058,863 | B2 | 11/2011 | Cho | |
| 8,482,342 | B2 | 7/2013 | Conte | |
| 8,704,588 | B2 | 4/2014 | Carvalho | |
| 8,878,511 | B2 | 11/2014 | Iacob et al. | |
| 9,235,229 | B2 | 1/2016 | Zhang | |
| 10,061,340 | B1 | 8/2018 | Rao | |
| 10,520,972 | B2 | 12/2019 | Horng | |
| 11,614,764 | B2 * | 3/2023 | Horng | G05F 3/30 323/313 |
| 2005/0231270 | A1 | 10/2005 | Washburn | |
| 2006/0043957 | A1 | 3/2006 | Carvalho | |
| 2006/0197584 | A1 | 9/2006 | Hsu | |

(Continued)

*Primary Examiner* — Kyle J Moody
(74) *Attorney, Agent, or Firm* — Merchant & Gould P.C.

(57) ABSTRACT

A bandgap reference (BGR) circuit is provided. The BGR circuit includes a first node, a second node, and a third node. A first resistive element is connected between the second node and the third node. The BGR circuit is operative to provide a reference voltage as an output. The BGR circuit further includes a current shunt path connected between the first node and the third node, the current shunt path being operable to regulate a voltage drop across the first resistive element.

20 Claims, 3 Drawing Sheets

(56) References Cited

U.S. PATENT DOCUMENTS

| | | | |
|---|---|---|---|
| 2012/0306370 | A1 | 12/2012 | Van De Ven et al. |
| 2016/0154415 | A1 | 6/2016 | Biziitu et al. |
| 2019/0101948 | A1 | 4/2019 | Eberlein |

* cited by examiner

BANDGAP REFERENCE CIRCUIT

PRIORITY CLAIM AND CROSS-REFERENCE

This application is a continuation of and claims priority to co-pending application U.S. patent application Ser. No. 17/396,981 titled "Bandgap Reference Circuit" filed Aug. 9, 2021, which is a continuation of and claims priority to U.S. patent application Ser. No. 16/682,683 titled "Bandgap Reference Circuit" filed Nov. 13, 2019, now U.S. Pat. No. 11,086,348, which is a continuation of and claims priority to U.S. application Ser. No. 16/195,176 titled "Bandgap Reference Circuit" filed Nov. 19, 2018, now U.S. Pat. No. 10,520,972, which claims priority to U.S. Provisional Patent Application No. 62/592,544 titled "Bandgap Reference Circuit" filed Nov. 30, 2017, the disclosures of which are hereby incorporated in entirety by reference.

BACKGROUND

Reference voltages are used in many applications ranging from memory, analog, and mixed-mode to digital circuits. Bandgap reference (BGR) circuits are used for generating such reference voltages. Demand for low-power and low-voltage operation is increasing with the spread of battery-operated portable applications. The reference voltage of conventional BGR is 1.25 V, which is nearly the same voltage as the bandgap of silicon. This fixed output voltage of 1.25 V limits low voltage operation of BGR circuits.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
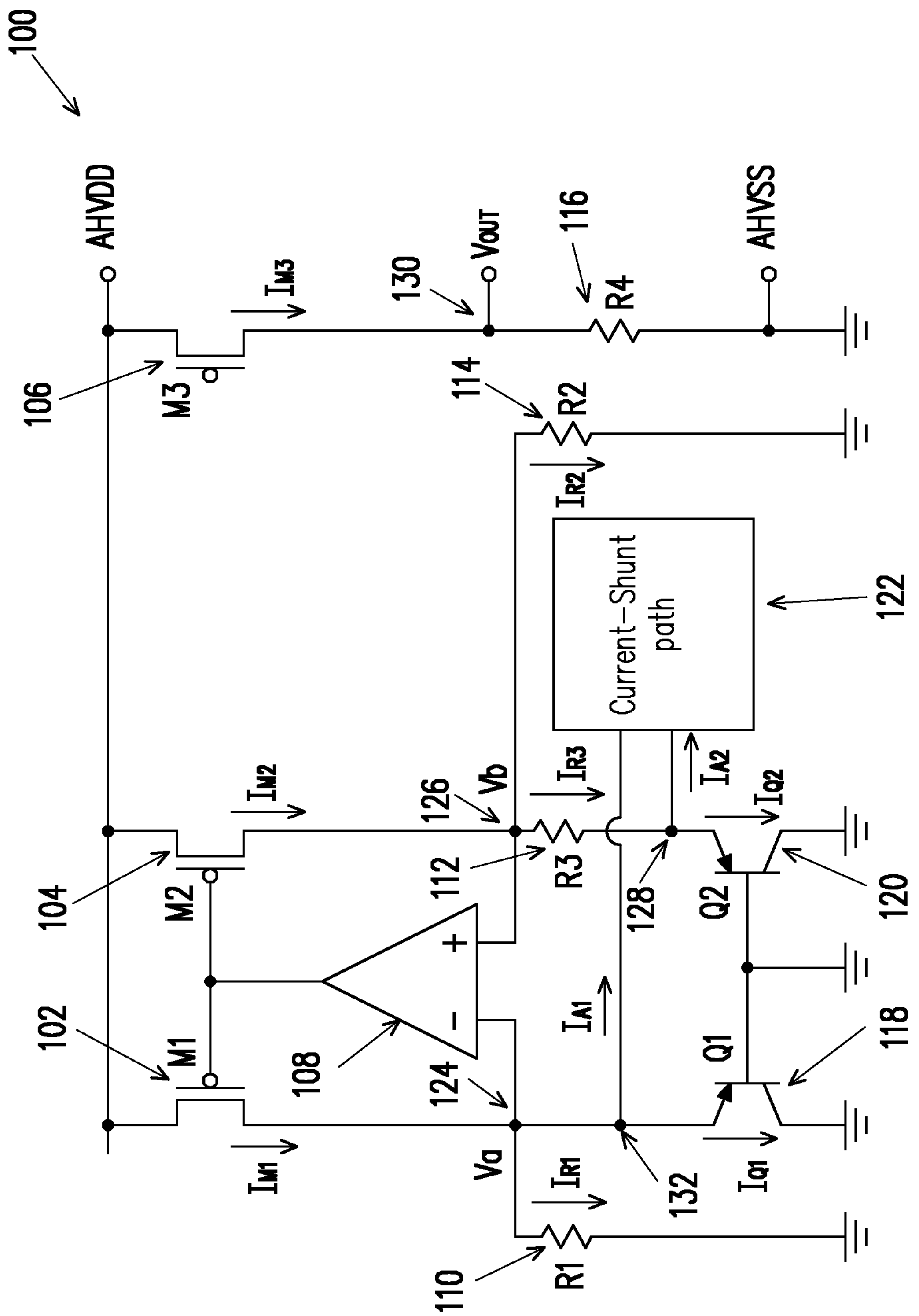
FIG. 1 illustrates a bandgap reference circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Traditional bandgap reference (BGR) circuits use, along with current mirrors, an array of bipolar junction transistors (BJT) to provide a desired reference voltage. Such traditional BJT based BGR circuits do not operate under 1.0V, since the voltage drop of the BJT is between 0.7-0.8V. Some traditional BGR circuits, therefore, use resistors to form a temperature independent current to provide sub-1.0V reference voltage. Such traditional BGR circuits are also referred to as a current-mode BGR circuits. However, in order to meet the low voltage specification, the impedance value of the resistors are high (i.e., greater than 200 mega ohms). Such high value resistors occupy a large area on the chip. In addition, the current mirrors of the current-mode BGR circuits operate near their sub-threshold region which degrades the performance of the current mirrors.

Another traditional approach to achieve the sub-1.0V reference voltage includes switched capacitor network (SCN) circuits. However, SCN circuits need additional clocks for operating the capacitors of the circuit and there is a voltage ripple (which varies with load current) on the reference voltage.

Consistent with embodiments of the present disclosure, a bandgap reference (BGR) circuit is disclosed. The BGR circuit disclosed herein includes a first plurality of current sources, a plurality of transistors, a plurality of resistive elements, a first comparator, and a current-shunt path. The current-shunt path includes a second plurality of current sources, a second comparator, and a resistive element. The current-shunt path is operable to regulate an amount of current that flows through at least one of the plurality of transistors. Thus, the transistors of the disclosed BGR circuit operate under 1.0 nA bias current. Moreover, the disclosed BGR circuit provides a reference voltage output of less than 0.7V. In addition, the current-shunt path enables the current sources of the disclosed BGR circuit to operate at a saturation region to provide good mismatch performance.

FIG. 1 illustrates an example circuit diagram of a BGR circuit 100 in accordance with some embodiments. As shown in FIG. 1, BGR circuit 100 includes a first current source M1 102, a second current source M2 104, and a third current source M3 106. First current source M1 102 is operable to provide a first current $I_{M1}$, second current source M2 104 is operable to provide a second current $I_{M2}$, and third current source M3 106 is operable to provide a third current $I_{M3}$. First current source M1 102, second current source M2 104, and third current source M3 106 are matched current sources or are substantially identical current sources. That is, the first current $I_{M1}$ is approximately equal to the second current IM2 which is approximately equal to the third current $I_{M3}$. That is:

$$I_{M1}=I_{M2}=I_{M3} \tag{1}$$

In example embodiments, the first current IM1 and the second current IM2 have an almost zero temperature coefficient. In example embodiments, first current source M1 102, second current source M2 104, and third current source M3 106 are p-type metal oxide (PMOS) transistors. An example of a PMOS transistor may include a metal oxide semiconductor field effect transistor (MOSFET). However, it will be apparent to a person with ordinary skill in the art after reading the description that PMOS transistor is exemplary in nature, and other types of transistors, such as, bipolar junction transistors (BJT), field effect transistors (FET), diffusion transistors, etc., may be used for first current source M1 102, second current source M2 104, and third current source M3 106.

As illustrated in FIG. 1, BGR circuit 100 further includes a first transistor Q1 118 and a second transistor Q2 120. In example embodiments, first transistor Q1 118 and second transistor Q2 120 are bipolar junction transistors (BJT). In other embodiments, first transistor Q1 118 and second transistor Q2 120 are diodes. However, it will be apparent to person with ordinary skill in the art after reading this disclosure that BJT and diodes are exemplary in nature, and other types of transistors may be used in BGR circuit 100. In addition, BGR circuit 100 includes a first resistor R1 110, a second resistor R2 114, a third resistor R3 112, and a fourth resistor R4 116. In example embodiments, a resistance value (also referred to as impedance value) of first register R1 110 is equal to second resistor R2 116. That is:

$$R1=R2 \tag{2}$$

As illustrated in FIG. 1, a first end of each of first current source M1 102, second current source M2 104, and third current source M3 106 are each connected to the bus potential VDD. A second end of first current source M1 102 is connected to a first end of first transistor Q1 118. The second end of first current source M1 102 is connected to the first end of first transistor Q1 118 at a first node 124. A first end of a first resistor R1 110 is also connected to first node 124. A second end of first transistor Q1 118, the gate of first transistor Q1 118, and a second end of first resistor R1 110 are connected to the ground. In example embodiments, a voltage or a potential of first node 124 is referred to as Va.

A second end of second current source M2 104 is connected to a first end of third resistor R3 112. In example embodiments, the second end of second current source M2 104 is connected to the first end of third resistor R3 112 at a second node 126. A first end of a second register R2 114 is also connected to second node 126. A voltage or potential of second node 126 is Vb.

A second end of second resistor R2 114 is connected to ground. A second end of third resistor R3 112 is connected to a first end of second transistor Q2 120. For example, the second end of third register R3 112 is connected to the first end of second transistor Q2 120 at a third node 128. A second end of second transistor Q2 120 is connected to the ground. In addition, the gate of first transistor Q1 118 is connected to ground. In example embodiments, a voltage difference between second node 126 and third node 128 is referred to as $dV_{BE}$. A second end of third current source M3 106 is connected to a first end of a fourth resistor R4 116 at a fourth node 130. A voltage or potential of fourth node 130 is the output voltage Vout (also referred to as the reference voltage or Vref) of BGR circuit 100. A second end of fourth resistor R4 116 is connected to the ground.

BGR circuit 100 further includes a first comparator 108. In example embodiments, comparator 108 includes two inputs and one output. As illustrated in FIG. 1, a first input of first comparator 108 is connected to first node 124 and a second input of first comparator 108 is connected to second node 126. An output of first comparator 108 is connected to the gates of each of first current source M1 102, second current source M2 104, and third current source M3 106.

In example embodiments, first comparator 108 is operable to compare the potentials of first node 124 and second node 126 (i.e. Va and Vb), and control outputs of first current source M1 102 and second current source M2 104 such that the potential at first node 124 is approximately equal to the potential at second node 126. That is:

$$Va=Vb \tag{3}$$

The output of first comparator 108 is also connected to the gate of third current source M3 106. Therefore, in accordance with an embodiment, first comparator 108 is operable to control each of the first current $I_{M1}$, the second current $I_{M2}$ and the third current $I_{M3}$. In some embodiments, first comparator 108 is connected in a negative feedback mode. In example embodiments, first comparator 108 is an amplifier, such as, an operational amplifier (OPAMP). However, it will be apparent to a person with the ordinary skill in the art after reading the description that the OPAMP is exemplary in nature, and other types of comparators may be used.

As shown in FIG. 1, BGR circuit 100 further includes a current-shunt path 122. A first end of current-shunt path 122 is connected to a fifth node 132 and a second end of current-shunt path 122 is connected to third node 128. Fifth node 132 is connected to first node 124. In example, embodiments, current shunt path 122 is operable to regulate an amount of current flowing through the transistors of BGR circuit 100. For example, current shunt path 122 is operable to regulate the amount of current flowing through first transistor Q1 118 and second transistor Q2 120. The amount of current is regulated by providing a shunt path for the current flowing through first transistor Q1 118 and second transistor Q2 120 and regulating a resistance value of a resistive element located on the shunt path. For example, current-shunt path 122 is operable to sink a first shunt current $I_{A1}$ at fifth node 132 and sink a second shunt current $I_{A2}$ at third node 128. In example embodiments, the first shunt current $I_{A1}$ is approximately equal to the second shunt current $I_{A2}$. That is:

$$I_{A1}=I_{A2} \tag{4}$$

In example embodiments, a current through first resistor R1 110, second resistor R2 114, and third resistor R3 112 is provided as $I_{R1}$, $I_{R2}$, and $I_{R3}$ respectively. Moreover, a current through first transistor Q1 118 and second transistor Q2 120 is provided as $I_{Q1}$ and $I_{Q2}$ respectively. In example embodiments, since Va is approximately equal to Vb (equation (3)) and the resistance value of first resistor R1 110 is approximately equal to the resistance value of second resistor R2 114 (equation (2)), the current through first resistor R1 110 is approximately equal to the current through second resistor R2 114. That is:

$$I_{R1}=I_{R2} \tag{5}$$

In example embodiments, and as provided in equation (4), the first shunt current $I_{A1}$ is substantially equal to the second shunt current $I_{A2}$. Therefore, currents through second resistor R2 114 and third resistor R3 112 (i.e. $I_{R2}$ and $I_{R3}$) are determined as:

$$I_{R3} = I_{A2} + I_{Q2} = \frac{dV_{BE}}{R3},\ I_{R2} = \frac{V_{BE}}{R2} \tag{6}$$

where $V_{BE}$ is the potential at second node 126 and $dV_{BE}$ is the potential difference between second node 126 and third node 128. In addition, the output voltage Vout for BGR circuit 100 is determined as:

$$V_{out} = I_{M3} \times R4 = (I_{R3} + I_{R2})R4 = \left(\frac{dV_{BE}}{R3} + \frac{V_{BE}}{R2}\right)R4 \tag{7}$$

As illustrated in equation (7), the output voltage of BGR circuit 100 is adjusted by adjusting the potential of second node 126 (i.e. $V_{BE}$) and the potential difference between second node 16 and third node 128 (i.e. $dV_{BE}$).

In example embodiments, the potential of second node 126 and the potential difference between second node 126 and third node 128 is adjusted by adjusting the currents $I_{R3}$ and $I_{Q2}$. For example, the potential difference between second node 126 and third node 128 can be increased or decreased by increasing or decreasing the current $I_{R3}$. In example embodiments, current-shunt path 122 is operable to adjust the currents $I_{R3}$ and $I_{Q2}$. In some examples, currents $I_{Q1}$ and $I_{Q2}$ are referred to as first and second bias currents $I_{Q1}$ and $I_{Q2}$.

Figure 2:
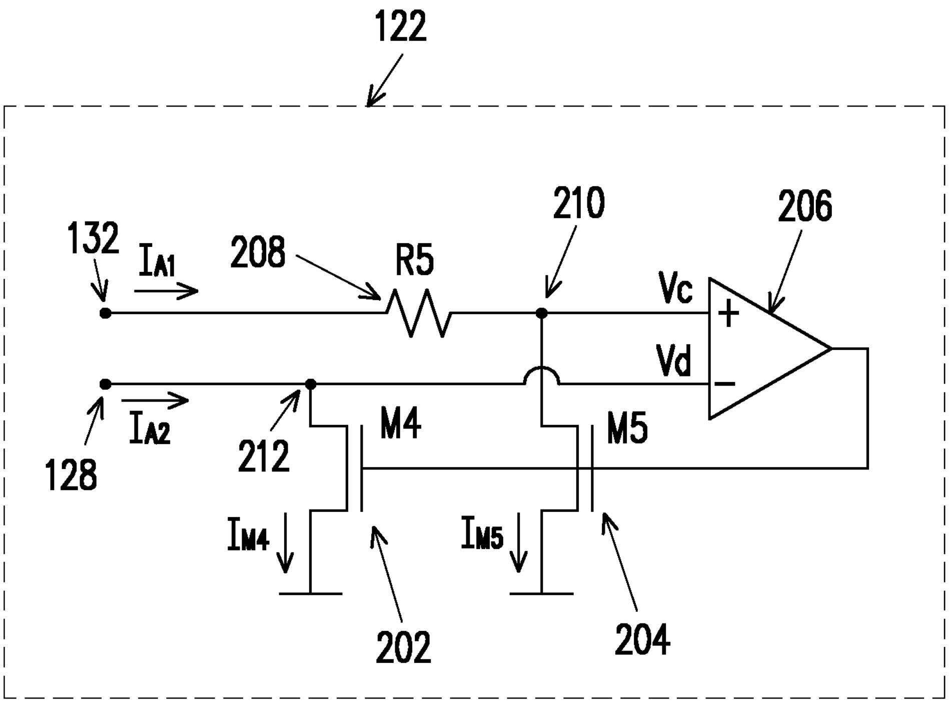
FIG. 2 illustrates a shunt path of the bandgap reference circuit, in accordance with some embodiments.

FIG. 2 illustrates a circuit diagram of current-shunt path 122. As shown in FIG. 2, current-shunt path 122 includes a fourth current source M4 202, a fifth current M5 204, a second comparator 206, and a fifth resistor R5 206. Fourth current source M4 202 and fifth current M5 204 are PMOS transistors, such as, MOSFETs. Second comparator 206 is an amplifier, such as, an OPAMP. It will be apparent to a person with ordinary skill in the art after reading the description that PMOS transistor is exemplary in nature, and other types of transistors, such as, bipolar junction transistors (BJT), field effect transistors (FET), diffusion transistors, etc., may be used for implementing fourth current source M4 202 and fifth current M5 204. Similarly, it will be apparent to a person with the ordinary skill in the art after reading the description that the OPAMP is exemplary in nature, and other types of comparators may be used.

A first end of fifth resistor R5 208 is connected to fifth node 132. A second end of fifth resistor R5 208 is connected to a first input of second comparator 206. As shown in FIG. 2, the second end of fifth resistor R5 208 is connected to the first input of second comparator 206 at a sixth node 210. A first end of fifth current source M5 204 is connected to fifth node 210. The potential of fifth node 210 is referred to as Vc.

A first end of fourth current source M4 202 is connected to a second end of second comparator 206. In example embodiments, the first end of fourth current source M4 202 is connected to a second end of second comparator 206 at seventh node 212. The potential of seventh node 212 is referred to as Vd. Seventh node 212 is connected to third node 128.

Second comparator 206 of current-shunt path 122 includes two inputs and one output. The output of second comparator 206 is connected to the gates of both fourth current source M4 202 and fifth current source M5 204. In example embodiments, second comparator 206 is operable to maintain the voltages at the first input and second input is substantially equal. For example, second comparator 206 is operable to continuously compare the voltages Vc and Vd. Based on the comparison, second comparator 206 is configured to control the amount of currents $I_{M4}$ and IM5 such that the voltages Vc and Vd are substantially equal. That is:

$$Vc=Vd \tag{8}$$

In example embodiments, fourth current source M4 202 and fifth current source M5 204 are operable to provide a fourth current $I_{M4}$ and fifth current $I_{M5}$ respectively. In example embodiments, fourth current source M4 202 and fifth current source M5 204 are mirrored or matched current sources operable to provide substantially same amount of currents. Hence, the fourth current $I_{M4}$ is approximately equal to the fifth current $I_{M5}$. That is:

$$I_{M4}=I_{M5} \tag{9}$$

In example embodiments, the current $I_{R3}$ of BGR circuit 100 is determined as:

$$I_{R3} = \frac{Vb - Vd}{R3} = \frac{dV_{BE}}{R3}, \tag{10}$$

$$I_{R3} = I_{M4} + I_{Q2} = I_{M5} + I_{Q2} = \frac{Va - Vc}{R5} + I_{Q2} = \frac{dV_{BE}}{R5} + I_{Q2}$$

As illustrated by equation (10), the current $I_{R3}$ can be adjusted by adjusting the current $I_{Q2}$ or the resistance value of fifth resistor R5 208. The current $I_{Q2}$ is determined as:

$$I_{Q2} = dV_{BE}\frac{R5 - R3}{R3R5} \rightarrow \frac{I_{Q2}}{I_{R3}} = \frac{dV_{BE}(R5 - R3)}{R3R5} \Big/ \frac{dV_{BE}}{R3} = \frac{R5 - R3}{R3} \tag{11}$$

As shown in equation (11), the bias current $I_{Q2}$ for second transistor Q2 120 of BGR circuit 100 depends on the resistance value of fifth resistor R5 208 and third resistor R3 112. Hence, according to embodiments, the bias current $I_{Q2}$ can be increased or decreased by increasing or decreasing the resistance value of fifth resistor R5 208. Second transistor Q2 120 is, thus, configurable to operate under 1.0 nA bias range to have less than 0.7V voltage drop. In addition, each first current source M1 102, second current source M2 104, and third current source M3 106 is operated at a saturation region for a better performance using current shunt path 122. For example, each of first current source M1 102, second current source M2 104, and third current source M3 106 is operated at approximately 0.2 uA.

In example embodiments, and as discussed above, current-shunt path 122 includes second comparator 206 in a negative feedback and a low value fifth resistor R5 208 to decrease the second bias current $I_{Q2}$ flowing into second transistor Q2 120. In addition, current-shunt path 122 decreases resistance values of first resistor R1 110, second resistor R2 114, and third resistor R3 112.

Figure 3:
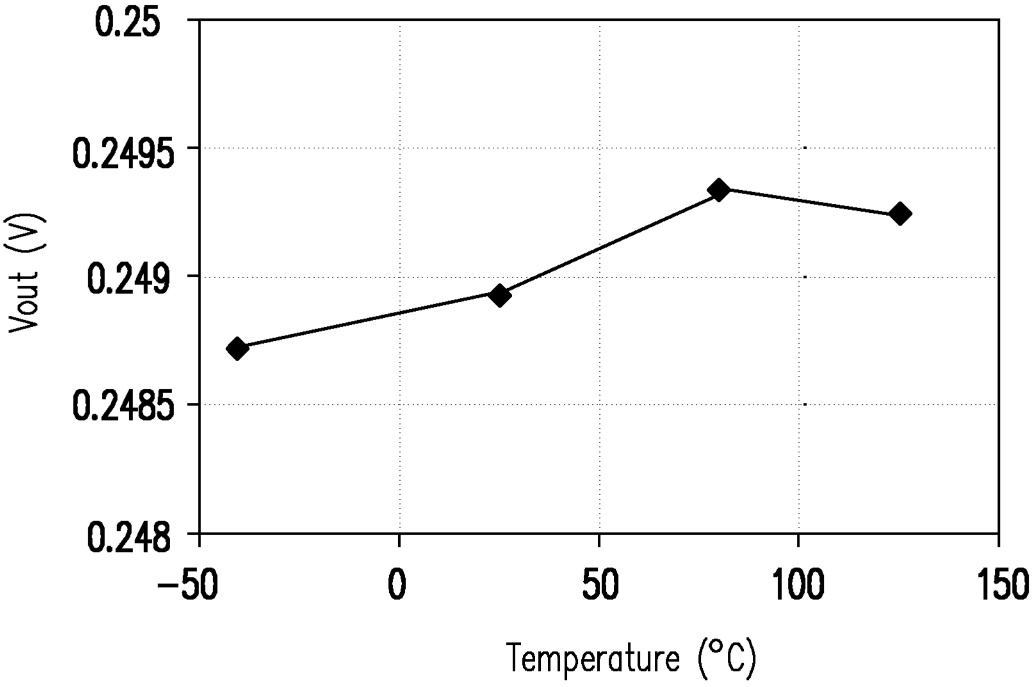
FIG. 3 illustrates a graph of bias voltage of transistors of the bandgap reference circuit, in accordance with some embodiments.

In example embodiments, after selection of the resistance value of first resistor R1 110, second resistor R2 114, and third resistor R3 112 and of first current source M1 102, second current source M2 104, and third current source M3 106, the resistance value of fifth resistor R5 208 can be selected to determine the shunt current and keep the output voltage Vout whose temperature dependence becomes negligently small. FIG. 3 illustrates a graphical representation of the output voltage Vout of BGR circuit 100 in a temperature range of −40° C. and 125° C. As illustrated in FIG. 3, the output voltage Vout for BGR circuit 100 is relatively stable over the temperature range of −40° C. and 125° C. and there is no ripple effect.

Figure 4:
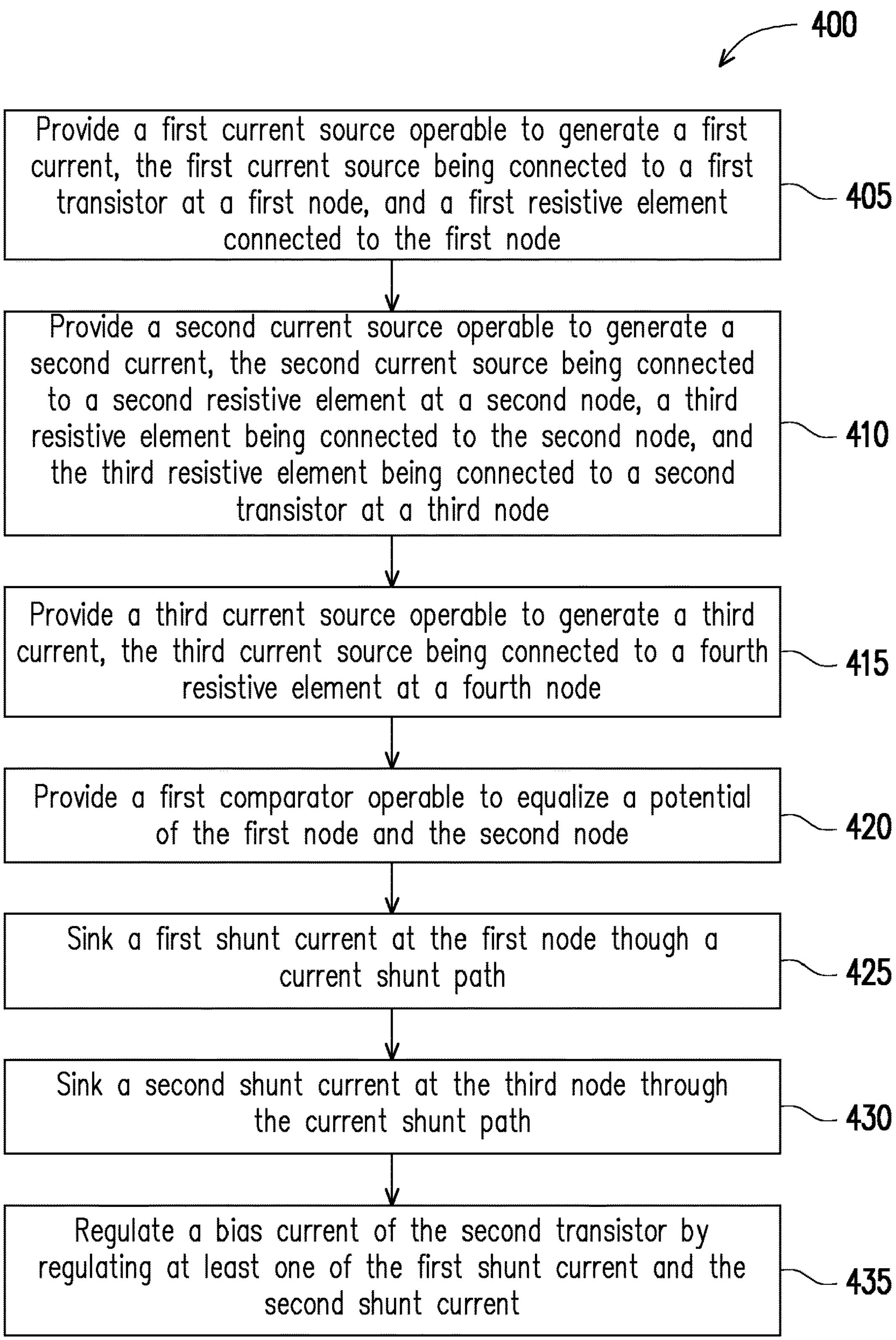
FIG. 4 illustrates a flow diagram of a method for providing a reference voltage, in accordance with some embodiments.

FIG. 4 illustrates steps of a method for providing a reference voltage. At operation 405 of method 400, a first current source operable to generate a first current is provided. For example, first current source M1 102 is provided to generate first current $I_{M1}$. In example embodiments, the generated first current $I_{M1}$ is sinked to a transistor. For example, the first current $I_{M1}$ is sinked to first transistor Q1 118 which is connected to first current source M1 102 at a first node 124. In addition, a first resistive element R1 110 is connected to first node 124.

At operation 410 of method 400, a second current source operable to generate a second current is provided. The generated second current is sinked to another transistor via a resistive element. For example, second current source M2 104 is provided which is operable to generate second current $I_{M2}$. The second current $I_{M2}$ is sinked to second transistor Q2 120 via third resistor R3 112 which is connected to second current source M2 104 at second node 126. Third resistor R3 112 is connected to second transistor Q2 120 at third node 128.

At operation 415 of method 400, a third current source operable to generate a third current is provided. The generated third current source is sinked to a resistive element. For example, third current source M3 106 is provided which is operable to generate third current $I_{M3}$. The third current $I_{M3}$ is sinked to fourth resistor R4 116. Fourth resistor R4 116 is connected to third current source M3 106 at fourth node 130.

At operation 420 of method 400, a first comparator operable to equalize a potential of the first node and the second node is provided. For example, first comparator 108 is operable to continuously compare the potential of first node 124 and second node 126. First comparator 108 is then operable to alter either the first current $I_{M1}$ or the second current $I_{M2}$ such that the potential of first node 124 is approximately equal to the potential of second node 126.

At operation 425 of method 400, a first shunt current is sinked at the first node though a current shunt path. For example, current-shunt path 122 is operable to sink the first shunt current $I_{A1}$ at first node 124. At operation 430 of method 400, a second shunt current is sinked at the third node through the current shunt path. For example, current-shunt path 122 is operable to sink the second shunt current $I_{A2}$ at third node 128.

At operation 435 of method 400, a bias current of the second transistor is regulated by regulating at least one of the first shunt current and the second shunt current. For example, bias current $I_{Q2}$ of second transistor Q2 120 is regulated by providing current-shunt path 122 between first node 124 and third node 128 thereby reducing the bias current $I_{Q2}$. The reference voltage is provided at fourth node 130.

In example embodiments, compared to traditional current-mode BGR circuits, the resistance value of the resistors of BGR circuit 100 (i.e., first resistor R1 112, second resistor R2 116, and third resistor 116) are smaller because of current-shunt path 122. In addition, the current mirrors of BGR circuit 100 (i.e., first current source M1 102, second current source M2 104, and third current source M3 106) operate in saturation range and meet the variation specifications. Moreover, unlike switched capacitor networks (CSN) circuits, BGR circuit 100 does not require additional clocks and does not exhibit a voltage ripple in the output voltage. Therefore, BGR circuit 100 does not require an output capacitor to stabilize the output voltage.

In accordance with an embodiment, a circuit includes a bandgap reference (BGR) circuit comprises a first node, a second node, and a third node, the first resistive element being connected between the second node and the third node, and the BGR circuit being operative to provide a reference voltage as an output; and a current shunt path connected between the first node and the third node, the current shunt path being operable to regulate a voltage drop across the first resistive element.

In accordance with an embodiment, a circuit includes a bandgap reference (BGR) circuit which includes a first node, a second node, a third node, and a fourth node. The BGR circuit is operable to: approximately equalize a potential difference between the first node and the second node and provide a predetermined reference voltage at the fourth node. The BGR circuit further includes a current shunt path operable to regulate an amount of a bias current of a first transistor of the BGR circuit, the first transistor being operative to sink the bias current at the third node, and the third node being connected to the second node.

In accordance with an embodiment, a method for providing a reference voltage is disclosed. The method includes providing a bandgap reference (BGR) circuit comprising a first node, a second node, a third node, and a fourth node, the BGR circuit being operable to provide a reference voltage output at the fourth node; injecting a first shunt current at the first node though a current shunt path; injecting a second shunt current at the third node through the current shunt path; and regulating a bias current of a transistor of the BGR circuit by regulating at least one of the following: the first shunt current and the second shunt current.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A Band Gap Reference (BGR) circuit, comprising:

a first node, a second node, a third node, a fourth node, and a first resistive element connected between the second node and the third node, and wherein the BGR circuit is operative to provide a reference voltage as an output at the fourth node; and a shunt current path connected between the first node and the third node, wherein the shunt current path comprises a second resistive element and a first amplifier connected to the second resistive element, wherein the first amplifier is connected to the second resistive element in a negative feedback, and wherein the shunt current path is operative to sink a shunt current to the first node.

2. The BGR circuit of claim 1, further comprising a second amplifier, wherein the second amplifier is operative to equalize potentials of the first node and the second node.

3. The BGR circuit of claim 1, further comprising a third resistive element connected between the first node and ground.

4. The BGR circuit of claim 1, wherein the shunt current path further comprises a first current source and a second current source, wherein the first current source is connected to a first input terminal of the first amplifier, wherein the second current source is connected to a second input terminal of the first amplifier, and wherein an output terminal of the first amplifier is connected to gates of each of the first current source and the second current source.

5. The BGR circuit of claim 1, further comprising a third current source connected to the first node and a fourth current source connected to the second node.

6. The BGR circuit of claim 1, further comprising a first transistor connected between the first node and a ground and a second transistor connected between the third node and the ground, wherein a gate of first transistor is connected to a gate of the second transistor.

7. The BGR circuit of claim 6, wherein the shunt current path is operative to minimize a current flowing through each of the first transistor and the second transistor.

8. The BGR circuit of claim 6, wherein the gate of first transistor and the gate of the second transistor is connected to the ground.

9. A Bandgap Reference (BGR) circuit comprising:

a first diode connected between a first node and a ground;

a first resistive element connected between a second node and a third node;

a second diode connected between the third node and the ground;

a first current source operative to sink a first current at the first node;

a second current source operative to sink a second current at the second node; and a shunt current path connected between the first node and the third node, wherein the shunt current path is operative to sink a first shunt current at the first node.

10. The BGR circuit of claim 9, where the shunt current path is further operative to sink a second current at the third node.

11. The BGR circuit of claim 9, wherein the shunt current path comprises a second resistive element and a first amplifier connected to the second resistive element, wherein the first amplifier is connected to the second resistive element in a negative feedback mode.

12. The BGR circuit of claim 11, wherein the shunt current path further comprises a third current source and a fourth current source, wherein the third current source is connected to a first input terminal of the first amplifier, wherein the fourth current source is connected to a second input terminal of the first amplifier, and wherein an output terminal of the first amplifier is connected to gates of each of the third current source and the fourth current source.

13. The BGR circuit of claim 9, further comprising a second diode connected between the third node and the ground.

14. The BGR circuit of claim 9, further comprising a second amplifier connected between the first node and the second node, wherein the second amplifier is operative to equalize potentials of the first node and the second node.

15. The BGR circuit of claim 14, wherein a first input terminal of the second amplifier is connected to the first node, wherein a second input terminal of the second amplifier is connected to the second node, and wherein an output terminal of the second amplifier is connected to each of the first current source and the second current source.

16. A circuit comprising:

a Bandgap Reference (BGR) circuit operative to provide a reference voltage as an output; and a shunt current path connected to the BGR circuit, wherein the shunt current path comprises:

a first amplifier comprising a first input terminal, a second input terminal, and an output terminal, a first resistive element connected between the BGR circuit and the first input terminal of the first amplifier, a first current mirror connected between the first input terminal of the first amplifier and the ground, and a second current mirror connected between the second input terminal of the first amplifier and the ground, wherein the output terminal of the first amplifier is connected to each of the first current source and the second current source.

17. The circuit of claim 16, wherein the shunt current path is operative to sink a shunt current to the BGR circuit.

18. The circuit of claim 16, wherein the BGR circuit comprises a first node, a second node, a third node, a fourth node, and a second resistive element connected between the second node and the third node, and wherein the BGR circuit is operative to provide the reference voltage at the fourth node.

19. The circuit of claim 18, wherein the BGR circuit further comprises a second amplifier connected between the first node and the second node, wherein the second amplifier is operative to equalize potentials of the first node and the second node.

20. The circuit of claim 18, wherein the BGR circuit further comprises:

a first current source operative to sink a first current at the first node; and a second current source operative to sink a second current at the second node.

* * * * *